United States Patent [19]
Willers

[11] 3,827,276
[45] Aug. 6, 1974

[54] SHIFT TRANSMISSION WITH SLIDEABLE GEAR-ENGAGING SLEEVE, PARTICULARLY FOR MOTOR VEHICLES

[75] Inventor: Eduard Willers, Kaarst, Germany

[73] Assignee: International Harvester Company, Chicago, Ill.

[22] Filed: Dec. 13, 1972

[21] Appl. No.: 314,886

[30] Foreign Application Priority Data
Dec. 15, 1971 Germany.......................... 2162341

[52] U.S. Cl..................................... 74/363, 74/375
[51] Int. Cl............................................. F16h 3/08
[58] Field of Search ............ 74/363, 362, 375, 364, 74/373, 374, 371; 192/48.91

[56] References Cited
UNITED STATES PATENTS

| | | | |
|---|---|---|---|
| 1,394,607 | 10/1921 | Campbell............................ | 74/375 |
| 1,410,511 | 3/1922 | Root............................... | 74/363 X |
| 1,852,247 | 4/1932 | Maier............................... | 74/375 |
| 1,950,110 | 3/1934 | Hartsock...................... | 192/48.91 X |
| 2,578,747 | 12/1951 | Schmid.......................... | 74/375 UX |
| 2,753,725 | 7/1956 | De Vlieg......................... | 74/363 X |

FOREIGN PATENTS OR APPLICATIONS

| | | | |
|---|---|---|---|
| 399,516 | 1909 | France............................... | 74/363 |
| 339,143 | 1930 | Great Britain..................... | 74/371 |

Primary Examiner—Samuel Scott
Assistant Examiner—J. Reep
Attorney, Agent, or Firm—Ronald C. Kamp; Floyd B. Harman

[57] ABSTRACT

Series of gears in constant mesh with their mating gears rotatably borne on a sleeve non-rotatably arranged on a shaft. Additional series of gears located at each end of the sleeve and being borne by the shaft, whereby the sleeve can be longitudinally shifted to engage one set or the other.

2 Claims, 1 Drawing Figure

PATENTED AUG 6 1974 3,827,276
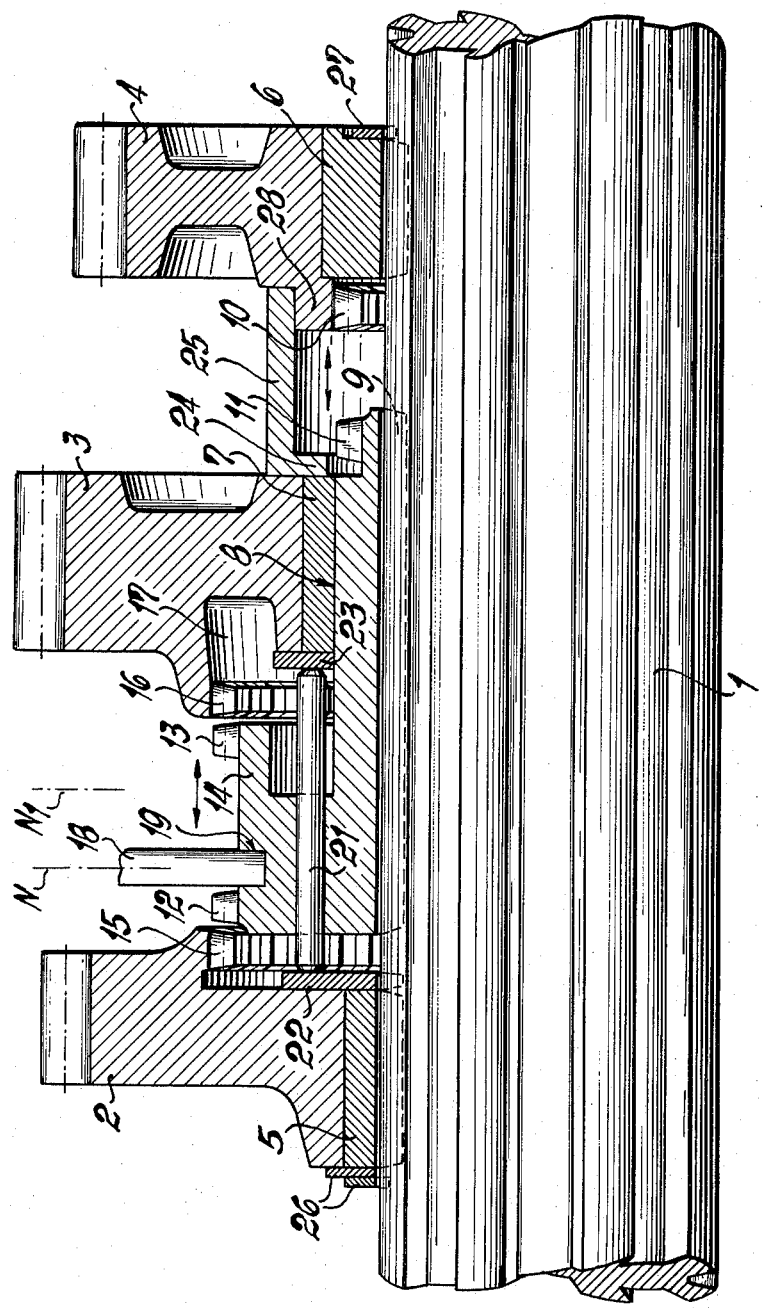

SHIFT TRANSMISSION WITH SLIDEABLE GEAR-ENGAGING SLEEVE, PARTICULARLY FOR MOTOR VEHICLES

The present invention relates to a shift transmission, particularly for motor vehicles, with at least three gears being in constant mesh with their mating gears, and with a sleeve non-rotatably arranged on a shaft for bearing the gears and located between the outer gears, that gear or those gears placed between the two outer gears being rotatably borne on the subject sleeve.

Such a shift transmission has become known by DT-PS German Pat. No. 1 016 571 to Ledwinka et al., with a publication date of Sept. 26 1957. On such a known transmission, the sleeve, which is non-rotatably connected with the shaft, cannot be displaced in axial direction. Therefore, a coupling of the outer gears with their bearing shaft is effected via shifting pins extending parallely to the shaft, said pins being connected with the sleeve whereby they directly project into bores or recesses of the coupling-type gears. The gear located between the two outer gears can be coupled with the shaft only by incorporating it in the power train via the sleeve, the shift pins, and a further sliding gear. For this purpose coupling teeth are provided on the additional sliding gear which can be brought into mesh with the coupling teeth of the center gear. Particularly on account of the required sliding gear the set-up of the known transmission mechanism is very complex, and there is much space required between the individual gears which will not always be available, especially if a transmission for a motor vehicle is concerned.

It is therefore the object of the present invention to create a shift transmission particularly suitable for motor vehicles and of the kind as mentioned at the outset which is characterized by a compact design and by a simple and trouble-free set-up. According to the invention this object is solved in that the sleeve consists of a slide bushing axially displaceable on the shaft and provided with coupling elements for coupling that slide bushing with the gears. As regards this invention, a single coupling element in form of a slide bushing is fully sufficient to optionally establish a positive connection between the individual gears and their bearing shaft. That is especially easily obtained in that one end of the slide bushing movably arranged between one of the outer gears and the center gear features a first row of coupling teeth and the other end, being displaceable between the outer gear and the center gear, a second and third row of coupling teeth on the opposite sides of a coupling flange which is larger in diameter than the bushing; a further characterization is that the coupling teeth can be associated with coupling ring gears laterally protruding from the facing gears. The sliding movement of the coupling sleeve for incorporating the various gears in the power train is essentially simply obtained in that the coupling ring gear at the center gear features an undercut that is wider than the axial extension of the coupling teeth interacting with the coupling ring gear at the coupling flange. Proceeding from a neutral position in which no gears are engaged the coupling sleeve of such a transmission can be axially displaced on the shaft in both directions such that one of the gears is respectively incorporated in the power train.

To keep the gears on the bearing shaft respectively the slide bushing in position, spacer elements are arranged between the individual gears which, for example, are designed as a backing ring surrounding the slide bushing and featuring a length corresponding to the distance between two adjacent gears or as pins extending through the coupling flange of the slide bushing. To avoid damage of the gear, thrust washers are located between the spacer elements and the side faces of the gears.

A preferred embodiment of the invention is represented in the drawing. Three gears 2,3 and 4 are located on an output shaft 1 of a motor vehicle transmission not shown in detail. The three gears 2,3 and 4 are in constant mesh with mating gears, not shown, of a drive-shaft of a motor vehicle transmission not shown either. The two outer gears 2 and 4 are borne on the output shaft 1 by means of plain bearings 5 and 6, whereas the center gear 3 is rotatably borne on a sleeve 8 by means of a plain bearing 7.

The sleeve 8 extending between the two outer gears is designed as slide bushing, i.e., proceeding from a first neutral position N, it can axially be displaced on output shaft 1 to both sides. The slide bushing 8 is non-rotatably connected with the output shaft 1 via a spline connection 9. At the end located between the outer gear 4 and the center gear 3 the slide bushing 8 features coupling teeth 11 that can be coupled or brought in mesh with a coupling ring gear 10 located at gear 4. Similar coupling teeth 12 and 13 are arranged on a larger-diameter flange 14 at the other end of slide bushing 8. At a corresponding axial displacement of slide bushing 8, the coupling teeth 12 can be brought in mesh with a coupling ring gear 15 arranged at the outer gear 2, whereas the coupling teeth 13 — upon a corresponding displacement of slide bushing 8 towards the other side — can be brought in mesh with a coupling ring gear 16 at the center gear 3. The coupling ring gear 16 at the center gear 3 is provided with an undercut 17 which is wider than the axial, longitudinal extension of the coupling teeth 13 of slide bushing 8. If the teeth 13 are within the area of the undercut 17, and if the teeth 11 are not yet in mesh with the coupling ring gear 10, the transmission is in a second neutral position N 1. The axial displacement of slide bushing 8 is effected by means of a commonly known shifter fork 18 supported in an annular groove 19 of slide bushing 8. Pins 21 extending parallel or axially to shaft 1 and backed by thrust washers 22,23 at the sides of gears 2 and 3 serve for axially guiding the slide bushing 8 and for keeping the distance of gears 2 and 3. A thrust ring 24 is located at the other side of gear 3. That thrust ring 24 is designed as one piece together with a backing ring 25 likewise serving as a spacer element, the other face of said thrust ring 24 contacting the coupling ring gear 10 of the outer gear 4. Towards the outer side, the outer gears 2 and 4 are secured against an axial displacement by common retaining rings 26,27. The backing ring 25 is advantageously supported on a lug 28 of gear 4.

Concerning the position of the slide bushing 8 as indicated on the drawing, the transmission is in neutral position N where none of the three gears 2,3 or 4 is drivingly connected with output shaft 1, i.e., positively connected with the power train. If the outer gear 2 shall be incorporated in the transmission power train, the slide bushing 8 is merely to be displaced to the left by shifter fork 18 until its coupling teeth 12 engage with the coupling ring gear 15 of gear 2. If the center gear 3 shall be incorporated in the power train, the slide bushing 8 is merely to be displaced to the right until the coupling teeth 13 engage with the coupling ring gear 16. If, however, there is wanted a power transfer via the other gear 4, the slide bushing 8 is to be displaced to such an extent until the coupling teeth 11 are covered by the coupling ring gear 10 of gear 4. In that position, the coupling teeth 13 of the slide bushing 8 are located in the undercut 17 so that the center gear 3 may not cause any impairment.

The present invention is not limited to the embodiment as described. Basically, there may be installed more than three gears. In that case, the slide bushing 8 is correspondingly made longer and is provided with a further row of coupling teeth. Such a feature of the transmission may, for example, be characterized in that the gear 2, too, is rotatably borne on the slide bushing 8.

What is claimed is:

1. In a gear shift transmission having a splined shaft, at least three gears axially spaced and supported on the shaft and each of the gears having a hollow hub portion on one side provided with an internal ring gear, a tubular sleeve having internal splines meshed to the shaft and having an external ring gear for each internal ring gear axially spaced along the sleeve, and a shifter means for axially shifting the sleeve and selectively engaging or disengaging cooperating external and internal ring gears wherein the improvement comprises:

the intermediate or second gear of the three axially spaced gears being journally mounted on a tubular bearing, the bearing being journally mounted on the sleeve between two of the three ring gears, first gear spacer means axially separating one of the three gears and the second gear including first bearing retaining means for preventing axial movement of the bearing in one direction upon axial movement of the sleeve in the one direction, and second gear spacer means axially separating the second and third gears including second bearing retaining means for preventing axial movement of the bearing in an opposite direction upon axial movement of the sleeve in the opposite direction.

2. In the combination claimed in claim 1 wherein the first bearing retaining means comprise a tube having one end journally mounted on the hub portion of the one gear, the opposite end of the tube having an inwardly radially extending flange abutting one side of the bearing and the side opposite the hub portion on the second gear, and wherein the second bearing retaining means comprise a washer journalled on the sleeve and having a side abutting the second side of the bearing and a concentric recessed hub within the hollow of the hub portion of the second gear, a second washer journally carried on the shaft and having a side abutting the third gear, and a pin slidably mounted in the sleeve and axially extending from the first to the second washers.

* * * * *